W. S. Carr,
Water-Closet Valve.
Nº 25,092. Patented Aug. 16, 1859.
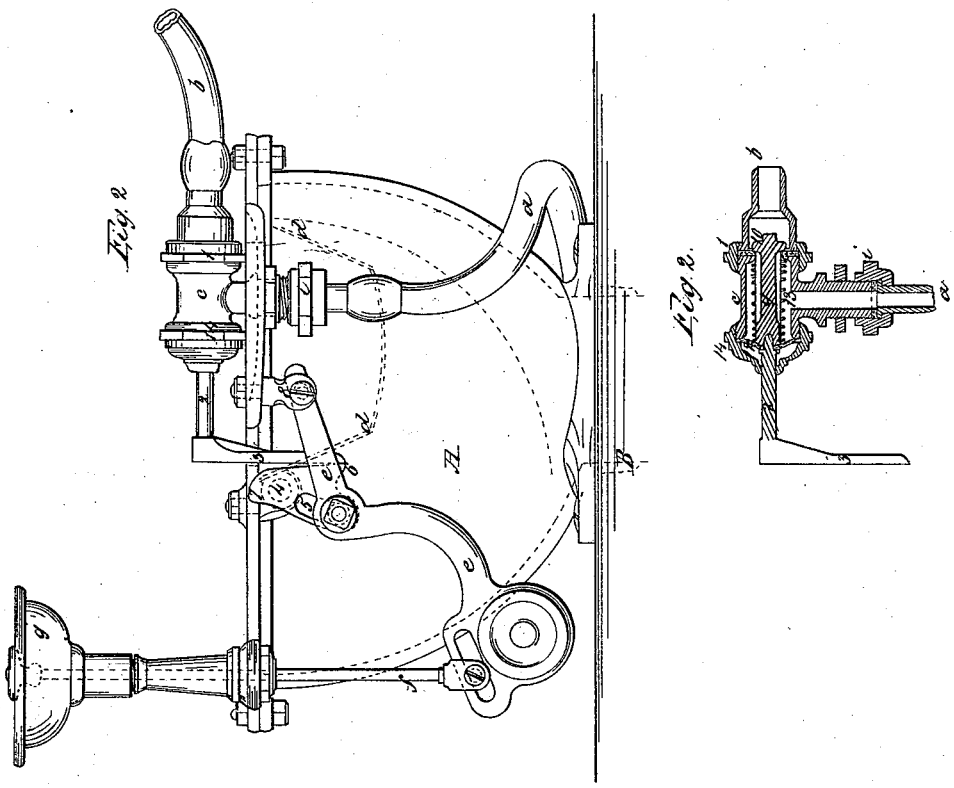
Witnesses
Lemuel W. Serrell
Thos Geo Harold
Inventor:
William S. Carr

UNITED STATES PATENT OFFICE.

WILLIAM S. CARR, OF NEW YORK, N. Y.

WATER-CLOSET.

Specification of Letters Patent No. 25,092, dated August 16, 1859.

*To all whom it may concern:*

Be it known that I, WILLIAM S. CARR, of the city and State of New York, have invented, made, and applied to use certain new and useful Improvements in Water-Closets; and I do hereby declare that the following is a full, clear, and exact description of the construction and operation of the same, reference being had to the annexed drawings, making part of this specification, wherein—

Figure 1 is a side elevation of my closet and Fig. 2 is a section of the supply cock.

Similar marks of reference denote the same parts.

In the construction and use of water closets difficulties have arisen in connection with the supply of water, that have rendered the cistern and ball cock almost indispensable; valves have been devised for closing gradually in order that the pan of the closet may fill with water, but often when the handle of the closet is pulled the water is being drawn from the supply pipe in one of the lower stories, and there is no water rises sufficiently high until after the valve or cock has closed, consequently the pan is left without water allowing the closet to smell, and remain unfit for use the next time from this lack of water in the pan.

My invention differs from all others in making the weight of water in the pan act as a regulator of the supply cock, that is to say, the lever that moves the pan of the closet causes the water valve to remain open any length of time necessary until the weight of water supplied into the pan so far counteracts the leverage that the cock is allowed to shut, thus it matters not how suddenly the pull of the closet be operated, or what condition the supply of water is in, the supply cock must remain open until the water fills the pan or nearly so.

In the drawing A, is the hopper of the closet, B the soil pipe, *d* is the pan on the spindle 4, within the hopper; *g* is the socket for the pull *f*, and *e*, is the lever and pin acting in the slot 5, on the end of the spindle 4, to throw the pan, all as usual.

*a*, is the pipe supplying water to the cock *c*, and *b*, is the pipe to the arm of the basin. The pipe *a*, is connected to the cock *e*, by the coupling 1, and *b*, by the coupling 1.

10 is a valve on a rod 9, closing against the leather 11, and 2, is the valve stem screwed into 9, and clamping at this point the diaphragm 12, whose edges are secured by the screw cap 14.

13 is a spring tending to keep the valve 10, to its seat. This valve however is very nearly balanced, because the pressure against the inside of 12, rather more than compensates the pressure against the valve, hence a slight force will open the valve (10) or allow it to close.

I provide an arm 3, on the end of the stem 2, and also cam pieces 6 and 7 projecting from the spindle 4, and acting on this arm. When the pull *f* is lifted the cam 7 acts on the arm 3, allowing a flow of water into the basin, and when the pull is dropped with the lever the pan comes up into place and the other cam 6 operates on the arm to hold the valve open until the weight of water in the pan is sufficient to give the lever *e*, a slight lifting and endwise movement, the hole at the fulcrum 8, being elongated for this purpose, which allows a sufficient descent of the pan and turn of the spindle 4, to release the cam 6, from the arm 3, and allow the cock to close. Thus the cock stays open until the pan is sufficiently filled to operate as above set forth.

The arm 3 may be adjustable on the spindle or stem 2, to compensate wear.

What I claim as my invention and desire to secure by Letters Patent is—

1. Regulating the action of the cock or valve in water closets by the joint operation of the lever and weight of water in the pan substantially as specified, whereby the cock or valve is kept open until the weight of water in the pan regulates the closing thereof.

2. I also claim the construction of the valve *c*, with the balancing diaphragm 12, valve 10 and spring 13, as set forth.

In witness whereof I have hereunto set my signature this fifteenth day of July 1859.

WILLIAM S. CARR.

Witnesses:
LEMUEL W. SERRELL,
THOS. GEO. HAROLD.